United States Patent [19]
Wakayama

[11] Patent Number: 6,026,502
[45] Date of Patent: Feb. 15, 2000

[54] METHOD AND MECHANISM FOR PREVENTING FROM INVADING OF COMPUTER VIRUS AND/OR HACKER

[76] Inventor: Hironori Wakayama, 1553-3, Hongo-cho, Ohmiya-shi, Saitama-ken, 330-0033, Japan

[21] Appl. No.: 09/017,057

[22] Filed: Jan. 27, 1998

[30] Foreign Application Priority Data

Jan. 27, 1997 [JP] Japan .................................. 9-012958

[51] Int. Cl.$^7$ .................................................. G06F 11/34
[52] U.S. Cl. .............................. 714/38; 714/37; 713/200; 713/201; 713/202; 709/217; 709/238; 348/7; 348/13
[58] Field of Search .................................. 713/200, 201, 713/202; 714/37, 38; 709/217, 238; 348/7, 13

[56] References Cited

U.S. PATENT DOCUMENTS

| | | | |
|---|---|---|---|
| 5,623,600 | 4/1997 | Ji et al. | 713/201 |
| 5,630,057 | 5/1997 | Hait | 713/200 |
| 5,889,943 | 3/1999 | Ji et al. | 713/201 |
| 5,919,257 | 7/1999 | Trostle | 713/200 |

OTHER PUBLICATIONS

"Real time detection and disablement of viruses in a data communication network", IBM Technical Disclosure, vol. 39, No. 4, Apr. 1996, pp. 289–292.

*Primary Examiner*—Ayaz R. Sheikh
*Assistant Examiner*—Rupal D. Dharia
*Attorney, Agent, or Firm*—Nikaido, Marmelstein, Murray & Oram LLP

[57] ABSTRACT

A method and mechanism enables viruses invading from a network to be erased prior to arrival at the server; and hackers are prevented from making remote control on the server. A storage device is provided between a server and a network connected to the server, so that data may be temporarily stored in the storage device. Also, a switching device is provided on the input and output sides of the storage device respectively. The switching device is capable of performing on-and-off switching operations in the state of being isolated electrically. The switching device is so controlled as to input data in the storage device while the switching device turns ON on the input side, and while the switching device turns OFF on the output side of the storage device and process the data thus inputted in the storage device while the switching device turns OFF both on the input and output sides of the storage device. A power supply associated with the storage device is put in the ON- or OFF-condition as required in the situation. The data is then output from the storage device while the switching device turns OFF on the input side, and while the switching device turns ON on the output side of the storage device.

2 Claims, 5 Drawing Sheets

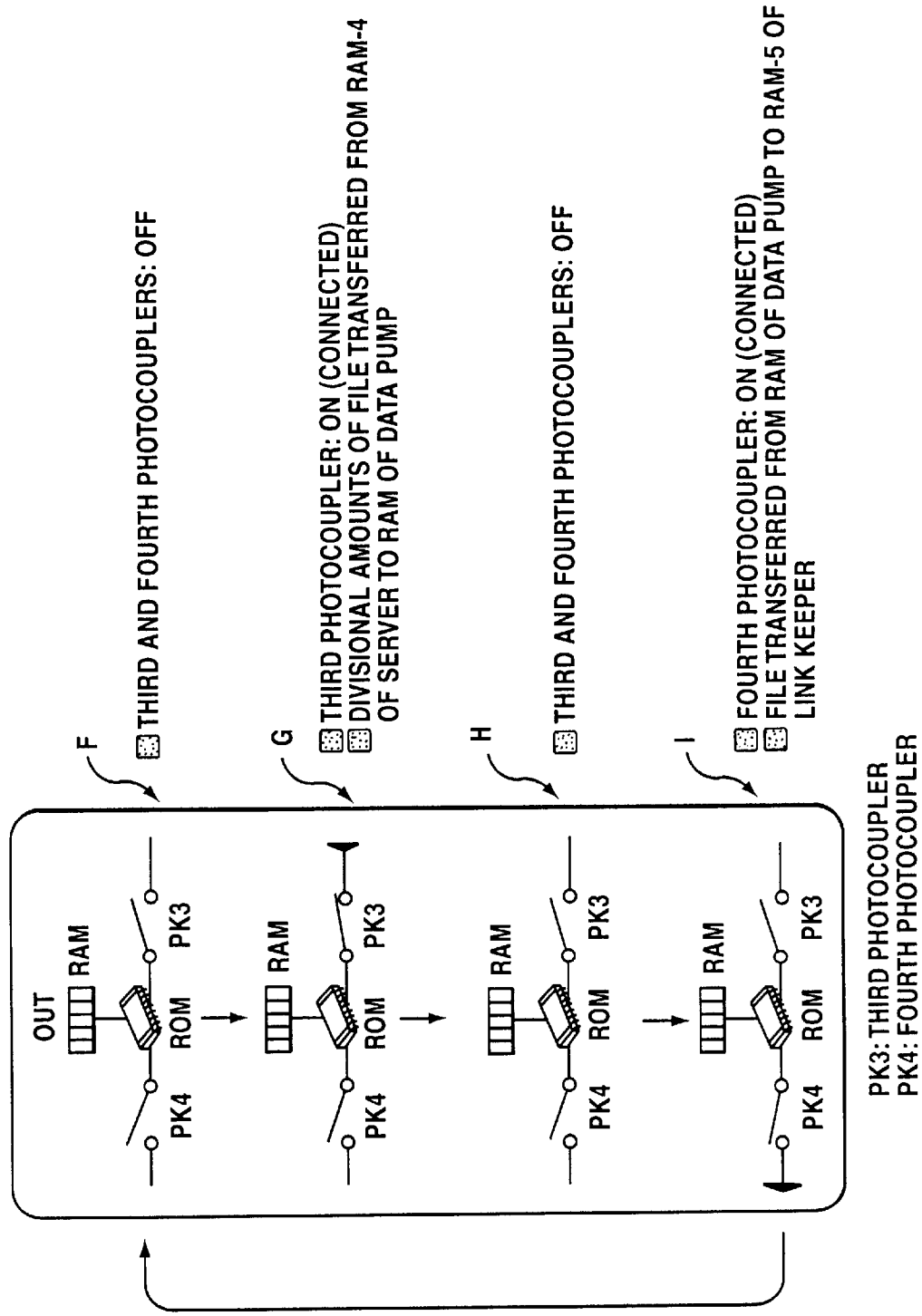

6,026,502

METHOD AND MECHANISM FOR PREVENTING FROM INVADING OF COMPUTER VIRUS AND/OR HACKER

FIELD OF THE INVENTION

The present invention relates to method and mechanism for preventing hackers and/or viruses from invading a server, and more particularly to method and mechanism which use: storage means between a network and the server for temporarily storing data; and switching means on the input and output sides of the storage means respectively, said switching means being capable of performing on-and-off switching operations in the state of being isolated electrically, whereby data may be permitted to be sent and received between the network and the server, provided that the switching means is prevented from turning ON simultaneously.

RELATED ART

Viruses invade from the exterior into memories via communication lines in the form of files, causing an adverse effect under certain condition to hack precious data and programs. A variety of anti-hacking programs are used as counter means. Some of such anti-hacking programs makes an associated warning system responsive to the finding of viruses for warning in sound, thereby preventing any hazards caused by viruses.

Among others one example of the method of detecting viruses is to make a search for each and every index of memory contents to determine whether the index contains an exact amount of recorded data.

In general hackers try to have an access to a selected server via communication lines by effecting a remote control on the server to retrieve desired data unlawfully.

These conventional anti-hacking methods are useful in finding out invading viruses, but they cannot eliminate or reject the so detected viruses. There has been, therefore, no recourse other than the discarding of the files contaminated with such viruses.

In the hope of preventing hackers from effecting a remote-control on the server passwords or personal identification numbers are periodically changed. However, there has been proposed no perfect practical counter means as yet.

There has been, therefore, an increasing demand for handling files actually or doubtfully contaminated viruses, and at the same time, preventing hackers from effecting a remote control on the server for access.

SUMMARY OF THE INVENTION

To meet such demands the method of preventing hackers or viruses from invading a selected server, which is connected to a given network for sending and receiving data from the network, according to the present invention comprises the steps of: providing storage means between the server and the network for temporarily storing data; providing switching means on the input and output sides of the storage means respectively, said switching means being capable of performing on-and-off switching operations in the state of being isolated electrically; and sending and receiving data between the network and the server, provided that the switching means is prevented from turning on simultaneously.

The step of sending and receiving data between the network and the server may comprise the steps of: inputting data in the storage means while the switching means turns ON on the input side, and while the switching means turns OFF on the output side of the storage means; processing the data thus inputted in the storage means while the switching means turns OFF both on the input and output sides of the storage means, and putting a power supply associated with the storage means in the ON- or OFF-condition as required in the situation; and outputting the data from the storage means while the switching means turns OFF on the input side, and while the switching means turns ON on the output side of the storage means.

Mechanism for preventing hackers or viruses from invading a selected server, which is connected to a given network for sending and receiving data from the network, according to the present invention comprises: storage means between the server and the network for temporarily storing data; switching means on the input and output sides of the storage means respectively, said switching means being capable of attaining on-and-off switching operations in the state of being isolated electrically; and means for controlling the switching means so as to: input data in the storage means while the switching means turns ON on the input side, and while the switching means turns OFF on the output side of the storage means; process the data thus inputted in the storage means while the switching means turns OFF both on the input and output sides of the storage means, and putting a power supply associated with the storage means in the ON- or OFF-condition as required in the situation; and output the data from the storage means while the switching means turns OFF on the input side, and while the switching means turns ON on the output side of the storage means.

As may be understood from the above, the anti-virus or hacker method and mechanism permit the pre-detection of viruses completely independent from the server prior to the inputting of data (file) from the network to the server, provided that the switching means is prevented from turning ON simultaneously both on the input and output side.

Remote control and access by hackers can be prevented by making sure that only one of the switches provided on the input and output sides is selectively made to turn ON when inputting and outputting data from the storage means in the state of being isolated electrically, thus not allowing signals to be conveyed directly from the network to the server or vice versa all the time.

As described above, the anti-virus or hacker method and mechanism permit the switches provided on the input and output sides of the storage means to turn ON or OFF alternately in the state of being isolated electrically, preventing the simultaneous turning-ON of the switches both on the input and output sides, and permitting the pre-detection of viruses in complete independent condition prior to the inputting of data into the server, and erasing viruses, if any with recourse to electrical means.

The switches used on the input and output sides of the storage means can perform on-and-off operations in the state of being isolated electrically, and one of the switches is selectively made to turn ON in inputting or outputting from the storage, thereby preventing signals from being conveyed directly from the network to the server or vice versa all the time. Thus, the remote control and access to the server by hackers can be prevented completely.

BRIEF DESCRIPTION OF THE DRAWINGS

FIG. 5 shows how the switches work on the server-to-the network data-transporting side.

DESCRIPTION OF THE PREFERRED EMBODIMENTS

Now, the anti-virus or anti-hacker method and mechanism according to the present invention are described by referring to the accompanying drawings.

Figure 1:
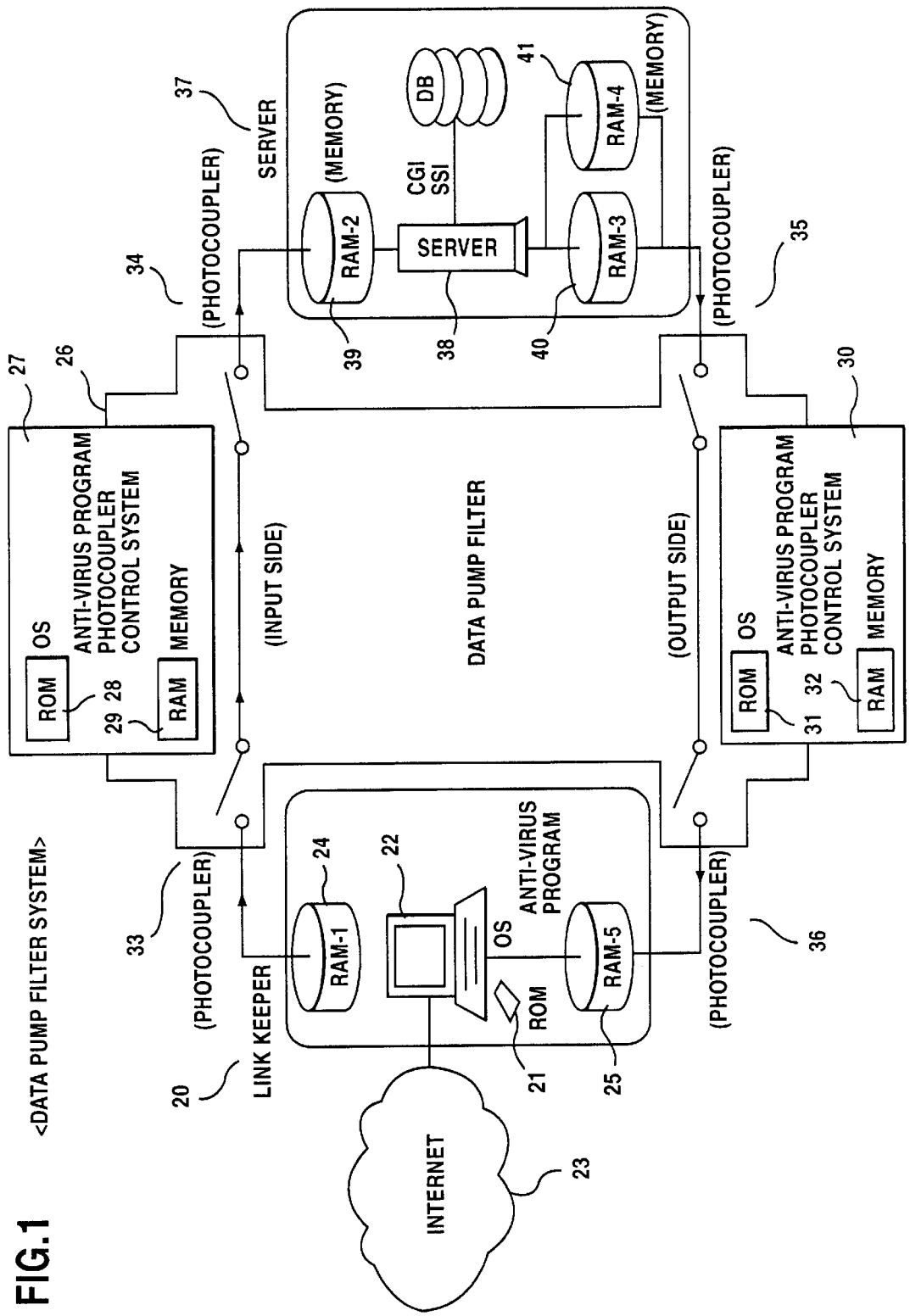
FIG. 1 illustrates the principle of preventing viruses from invading into a server according to the present invention.

Referring to FIG. 1, the anti-virus or anti-hacker mechanism comprises a link keeper 20 for making a required connection to a given network 23, a storage means in the form of data pump filter 26, which is capable of removing power supplies from memories if stored data is find to be contaminated with virus, and a server 37.

The link keeper 20 is a line-connection system including a processor 22, an associated ROM 21 containing an operating system program for processing data supplied from internet 23 or other network and an anti-virus program for detecting viruses if any, a first RAM 24 (RAM-1) for storing data supplied from the internet 23, and a fifth RAM 25 (RAM-5) for supplying data to the internet 23.

The data pump filter 26 comprises two data pumps 27 and 30 allotted for transporting data from the link keeper 20 to the server 37 and for transporting data from the server 37 to the link keeper 20 respectively and first, second, third and fourth photocouplers or optoisolators 33, 34, 35 and 36 (PK1, PK2, PK3 and PK4).

The data pump filter 27 on the link keeper-to-server data-transporting side (INPUT SIDE) includes a ROM 28 containing an operating system program OS and an anti-virus program for detecting viruses if any, and a photocoupler controlling program for making selected photocouplers to turn ON or OFF in the state of being isolated electrically, and a RAM 29 for storing data supplied from the link keeper 20.

The data pump filter 30 on the server-to-link keeper data-transporting side (OUTPUT SIDE) includes a ROM 31 containing an operating system program OS and an anti-virus program for detecting viruses if any, and a photocoupler controlling program for making the third and fourth photocouplers to turn ON or OFF, and a RAM 32 for storing data supplied from the server 37.

The server 37 includes a processor 38, an associated data base DB for storing data according to the CGI (Common Gateway Interface) or SSI (Server Side Include) program under the control of the processor 38, a second RAM 39 (RAM-2) for receiving and storing data supplied from the data pump 27 on the INPUT SIDE, and third and fourth RAMs 40 and 41 (RAM-3 and RAM-4) for storing data to be outputted on the OUTPUT SIDE.

As for the connecting of these parts in the anti-virus or hacker apparatus the output terminal of the link keeper 20 is connected to the input terminal of the data pump 27 on the INPUT SIDE via the first photocoupler 33; the output terminal of the data pump 27 on the INPUT SIDE is connected to the server 37 via the second photocoupler 34; the output terminal of the server 37 is connected to the input terminal of the data pump 30 on the OUTPUT SIDE via the third photocoupler 35; and the output terminal of the data pump 30 on the OUTPUT SIDE is connected to the input terminal of the link keeper 20 via the fourth photocoupler 36.

The manner in which data is inputted in and outputted from the server 37 via the data pump filter 26 is described below with reference to FIGS. 2, 3, 4 and 5.

Figure 2:
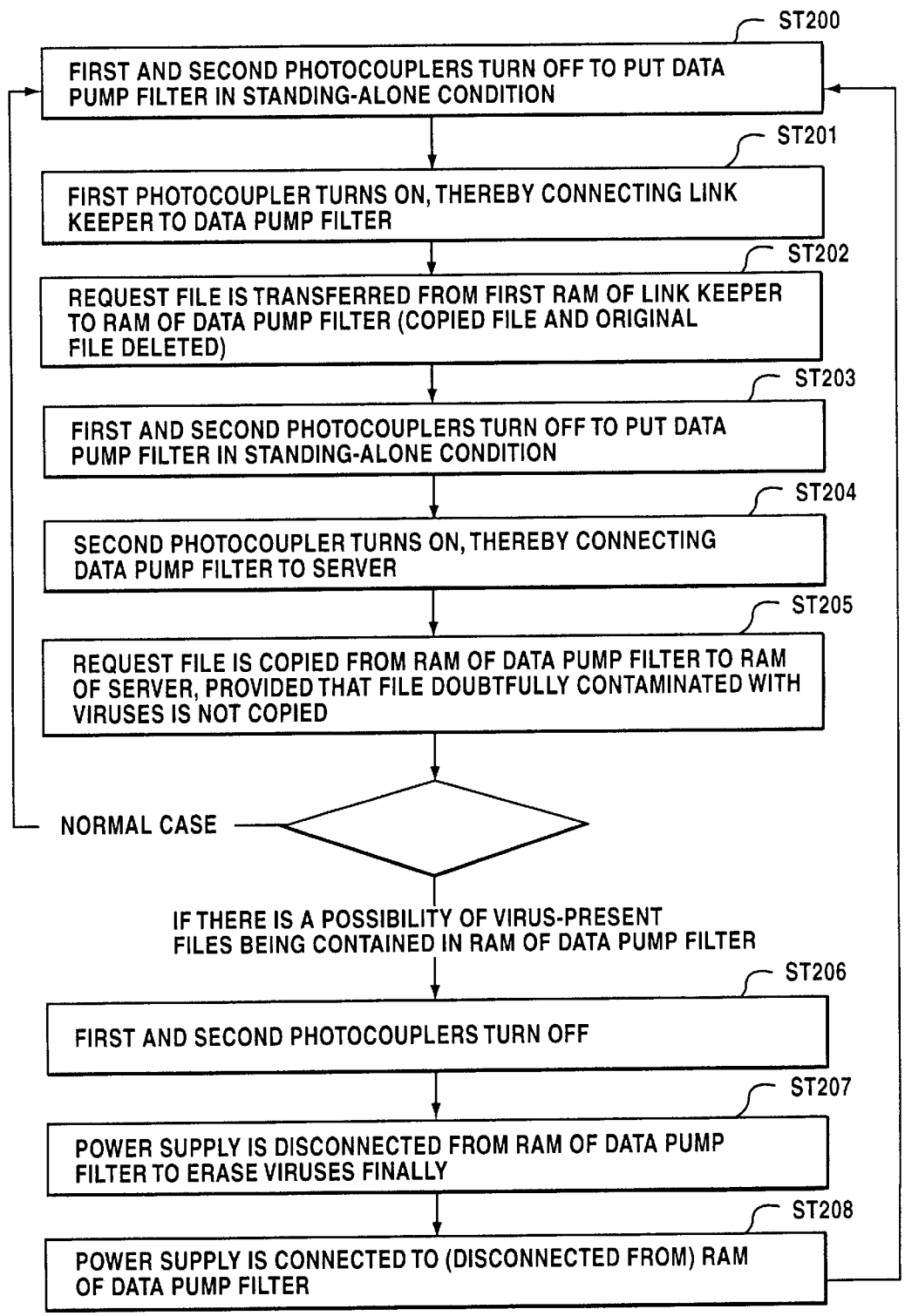
FIG. 2 is a flow-chart describing how the switches work on the network-to-the server data-transporting side.
Figure 3:
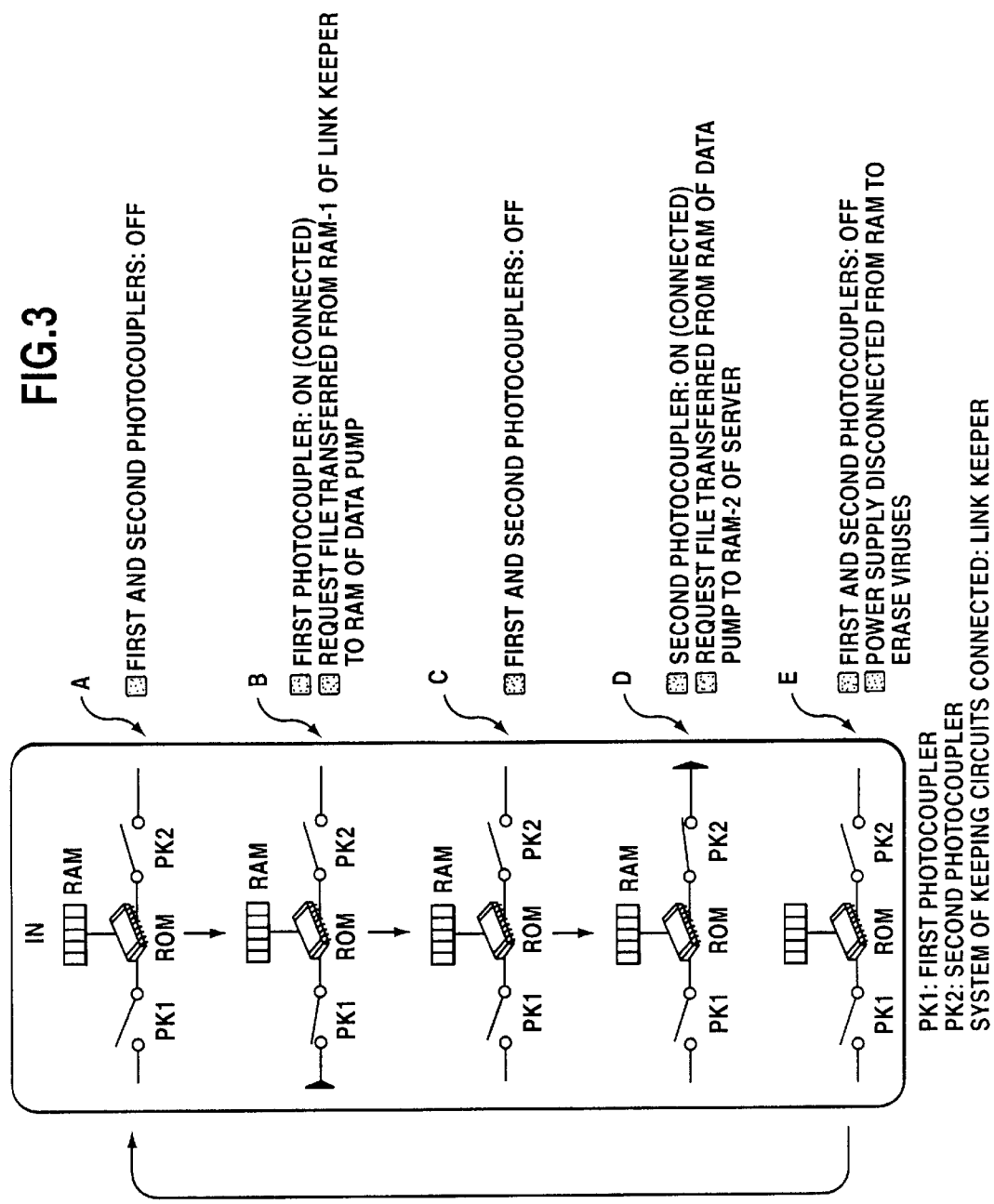
FIG. 3 shows how the switches work on the network-to-the server data-transporting side.

Referring to FIGS. 2 and 3, the manner in which data is inputted in the server 37 is described: the first and second photocouplers 33 and 34 are made to turn OFF to put the data pump 27 on the INPUT SIDE in the standing-alone condition (see FIG. 3, A and ST 200).

Next, the first photocoupler 33 on the input side of the data pump 27 is made to turn ON, thereby connecting the link keeper 20 to the data pump 27 on the INPUT SIDE (see FIG. 3, B and ST 201).

Data (Request File) is transferred from the first RAM 24 of the link keeper 20 to the RAM 29 of the data pump 27 on the INPUT SIDE (ST 202).

The first and second photocouplers 33 and 34 are made to turn OFF to put the data pump 27 on the INPUT SIDE in the standing-alone condition, and the data thus inputted is subjected to virus-detecting process. If the data is found to be actually or doubtfully contaminated with viruses, the power supply associated with the RAM 29 is disconnected to erase the stored data, and thereafter, the power supply is connected to the RAM 29 (see FIG. 3, C and ST 203).

Next, the second photocoupler 34 on the output side of the data pump 27 on the INPUT SIDE is made to turn ON, thereby connecting the data pump 27 to the server 37 (see FIG. 3, D and ST 104).

Data (request file) is transferred from the RAM 29 of the data pump 27 on the INPUT SIDE to the second RAM 39 of the server 37 (ST 205). The data thus transferred is free of viruses; viruses if any, would be erased while the contaminated data was retained in the "standing-alone" data pump 27 (ST 203).

In other words, virus-free data is allowed to pass to the server 37 via the above steps. When the data is found to be actually or doubtfully contaminated with viruses, the power supply associated with the RAM 29 is disconnected in the state the first and second photocouplers 33 and 34 turned OFF (standing-alone condition) (ST 206) to erase the stored data, and thereafter, the power supply is connected to the RAM 29 to return to the step ST 200 (ST 207, ST 208)

As may be understood from the above, if data transferred from the internet 23 is found to be contaminated with viruses, such data will be erased completely by removing electric power from the memories so that viruses if any may be prevented from invading the subsequent stage. The first and second photocouplers 33 and 34 cannot be made to turn on simultaneously, and therefore, the continuous flow of signals on the downstream side, that is, toward the server 37 is prevented. Thus, hackers are not permitted to make remote control on the server 37 for access.

Figure 4:
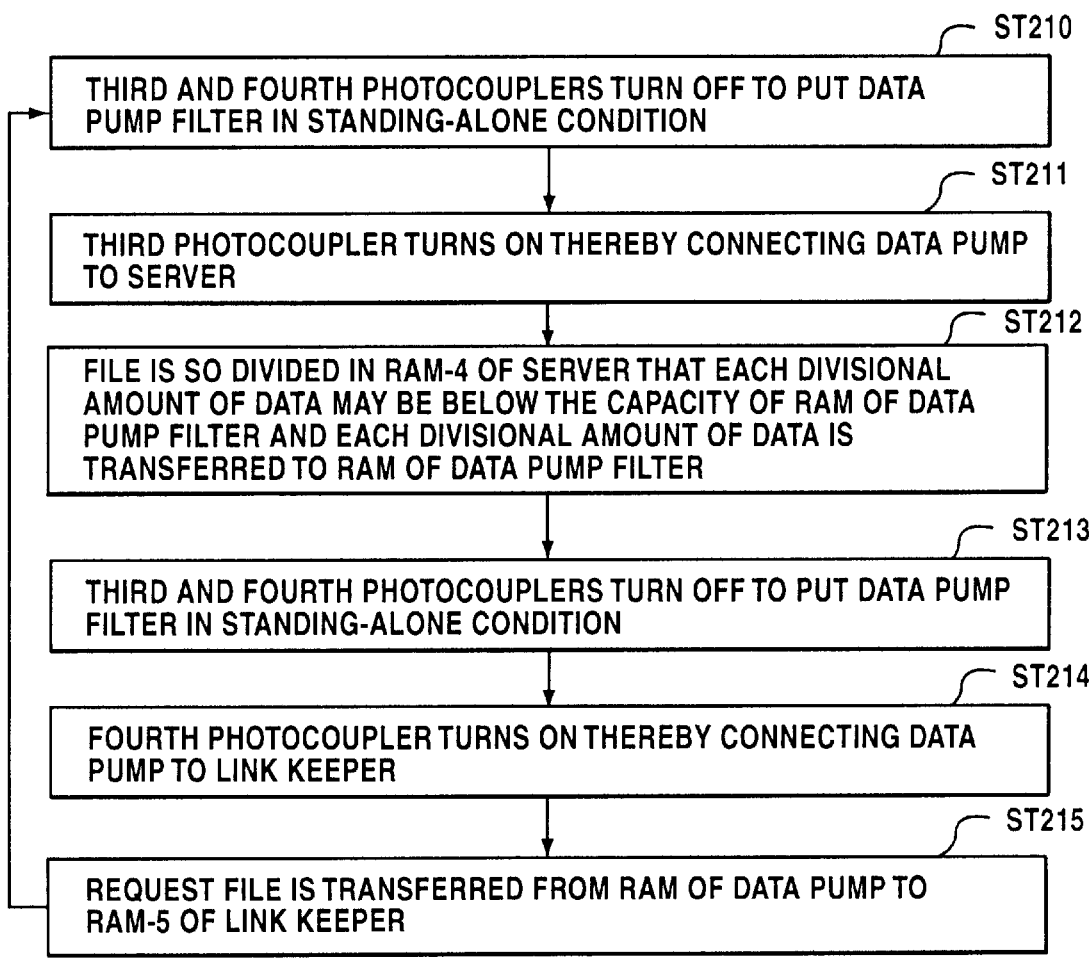
FIG. 4 is a flow-chart describing how the switches work on the server-to-the network data-transporting side.

Referring to FIGS. 4 and 5, the manner in which data is outputted from the server 37 to the internet 23 is described: the third and fourth photocouplers 35 and 36 are made to turn off to put the data pump 30 on the OUTPUT SIDE in the standing-alone condition (see FIG. 5, F and ST 210).

Next, the third photocoupler 35 on the input side of the data pump 30 on the OUTPUT SIDE is made to turn on, thereby connecting the server 37 to the data pump 30 on the OUTPUT SIDE (see FIG. 5, G and ST 211).

Data (File) is so divided in the fourth RAM 41 of the server 37 that each divisional amount of data may be equal to or below the capacity of the RAM 32 of the data pump 30 on the OUTPUT SIDE, and then, data thus divided is transferred from the RAM 32 of the data pump 30 on the OUTPUT SIDE (ST 212).

The third and fourth photocouplers 35 and 36 are made to turn off to put the data pump 30 on the OUTPUT SIDE in the standing-alone condition, and the data already inputted is subjected to virus-detecting process. If the data is found to be actually or doubtfully contaminated with viruses, the power supply associated with the RAM 32 is disconnected to erase the stored data, and thereafter the power supply is connected to the RAM 32 again (see FIG. 5, H and ST 213).

Next, the fourth photocoupler 36 on the output side of the data pump 30 is made to turn on, thereby connecting the data pump 30 to the link keeper 20 (see FIG. 5, I and ST 214).

Data is transferred from the RAM 32 of the data pump 30 on the OUTPUT SIDE to the fifth RAM 25 of the link keeper 20 (ST 215).

As may be understood from the above, in sending data from the server 37 to the internet 23 the third and fourth photocouplers 35 and 36 are so controlled that the server 37 may be physically isolated from the side of the internet 23. The third and fourth photocouplers 35 and 36 are not allowed to turn on simultaneously, and therefore, the continuous flow of signals on the downstream side, that is, toward the internet 23 is prevented. Thus, hackers are not permitted to make remote control on the server 37 for access.

Referring to FIGS. 1, 3 and 5, the manner in which the anti-virus or anti-hacker apparatus works is described: the apparatus sterilizes data if contaminated while isolating the server 37 from the internet 23, and the apparatus sends the contamination-free data to the internet 23 while isolating the server 37 from the internet 23 again, thereby preventing hackers from making remote control on the server for access.

First, assuming that a user makes a request for some processing via the internet 23, he puts the request data in the first RAM 24 of the link keeper 20, in which viruses, if any will be erased, and then identification and de-cryptography are conducted according to the Session ID.

The first photocoupler 33 is made to turn on in regular time-intervals according to the CRON program, which resides in the ROM 28, thereby permitting new data to be transferred from the first RAM 24 to the RAM 29 of the data pump 27 on the INPUT SIDE, while the second photocoupler 34 is put in the "off"-condition (FIG. 3, B).

Assuming that some viruses survive from the virus-cide process in the link keeper 20, the first and second photocouplers 33 and 34 are made to turn off to isolate the data pump 27, and the associated power supply is disconnected from the RAM 29 in the data pump 27 on the INPUT SIDE (see FIG. 3, E).

Next, the first photocoupler 33 is made to turn off, and the second photocoupler 34 is made to turn on, thereby permitting the data to be transferred to the second RAM 39 of the server 37 (see FIG. 3, D).

In case that there exists no virus the data is transferred from the RAM 29 of the data pump 27 to the second RAM 39 of the server 37 when the second photocoupler 34 is made to turn on. Then, the CGI or SSI program is driven to cause required process to be conducted to meet the request, and the results are written into the third RAM 40. The contents of the RAM 40 are so divided that each divisional amount of data may be below the storage capacity of the RAM 32 of the data pump 30 on the OUTPUT SIDE, and then the divisional amount of data is transferred in the fourth RAM 41. The first and second photocouplers 33 and 34 are prevented from turning on simultaneously, and therefore, no remote control on the server is permitted.

On the other hand the third photocoupler 35 is made to turn on in regular time-intervals according to the CRON program, which resides in the ROM 31 of the data pump 30 on the OUTPUT SIDE, thereby permitting data to be transferred from the fourth RAM 41 of the server 37 to the RAM 32 of the data pump 30 on the OUTPUT SIDE, while the fourth photocoupler 36 remains off (FIG. 5, G).

Then, the third photocoupler 35 turns OFF, and the fourth photocoupler 36 turns ON according to the CRON program, thereby permitting the data to be transferred from the RAM 32 to the fifth RAM 25 of the link keeper 20. The data stored in the fifth RAM 25 is built up in the form of files according to the CGI or SSI program by the processor 22 of the link keeper 20 for sending to the user via the internet 23.

As may be understood from the above, the server 37 is invisible to outsiders, thereby preventing hackers from making remote control on the server for access.

What is claimed is:

1. Method of preventing hackers or viruses from invading a selected server, which is connected to a given network for sending and receiving data from the network characterized in that it comprises the steps of:

providing storage means between the server and the network for temporarily storing data;

providing switching means on the input and output sides of the storage means respectively, said switching means being capable of performing on-and-off switching operations in the state of being isolated electrically; and sending and receiving data between the network and the server, provided that the switching means are prevented from turning on simultaneously, wherein the step of sending and receiving data between the network and the server comprises the steps of:

(i) inputting data in the storage means while switching means turns ON on the input side, and while the switching mean turns OFF on the output side of the storage means;

(ii) processing the data thus inputted in the storage means while the switching means turns OFF both on the input and output sides of the storage means, and putting a power supply associated with the storage means in the on- or off-condition as required by detection of a hacker or a virus; and (iii) outputting the data from the storage means while the switching means turns OFF on the input side, and while the switching means turns ON on the output side of the storage means.

2. Apparatus of preventing hackers or viruses from invading a selected server, which is connected to a given network for sending and receiving data from the network characterized in that it comprises:

storage means between the server and the network for temporarily storing data;

switching means on the input and output sides of the storage means respectively, said switching means being capable of attaining on-and-off switching operations in the state of being isolated electrically; and means for controlling the switching means so as to: input data in the storage means while the switching means turns ON on the input side, and while the switching means turns OFF on the output side of the storage means; process the data thus inputted in the storage means while the switching means turns OFF both on the input and output sides of the storage means and puffing a power supply associated with the storage means in the on- or off-condition as required by detection of hacker or a virus; and output the data from the storage means while the switching means turns OFF on the input side, and while the switching means turns ON on the output side of the storage means.

* * * * *